Oct. 2, 1962 G. F. TOPINKA ETAL 3,056,385
PISTON CUSHION FOR FLUID OPERATED CYLINDER
Filed Feb. 1, 1961 2 Sheets-Sheet 1

INVENTORS
GEORGE F. TOPINKA
ZDENEK J. LANSKY
BY
John N. Wolfram
ATTORNEY

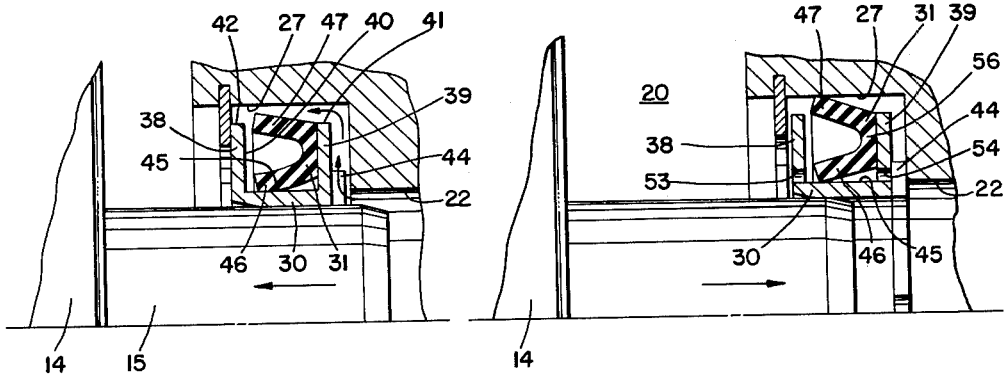
Fig. 4
Fig. 5
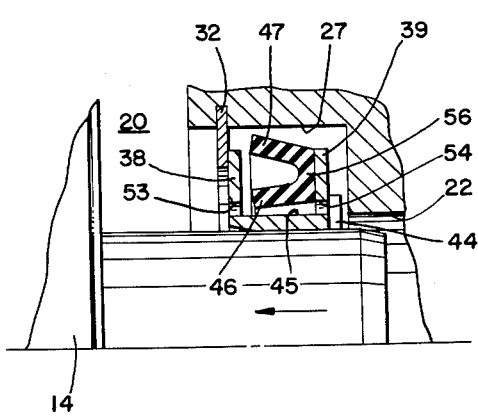
Fig. 6
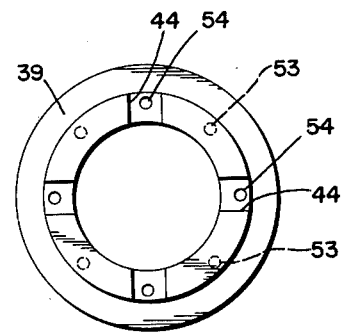
Fig. 7
INVENTORS
GEORGE F. TOPINKA
ZDENEK J. LANSKY
BY
John N. Wolfram
ATTORNEY United States Patent Office 3,056,385
Patented Oct. 2, 1962

3,056,385
PISTON CUSHION FOR FLUID OPERATED CYLINDER
George F. Topinka, Riverside, and Zdenek J. Lansky, North Riverside, Ill., assignors to Parker-Hannifin Corporation, Cleveland, Ohio, a corporation of Ohio
Filed Feb. 1, 1961, Ser. No. 86,526
14 Claims. (Cl. 121—38)

This invention relates to fluid pressure operated cylinders and more particularly relates to a means within the cylinder for cushioning the stopping of the piston at the end of its stroke.

Various methods for cushioning the piston have heretofore been proposed. In one of these methods, a part on the piston moves into a passage through which fluid is being expelled from the cylinder by the piston and closes the same to trap a relatively small volume of fluid within the cylinder. This fluid acts upon the adjacent side of the piston to cushion the stopping of the same.

To reverse the piston stroke, fluid is then introduced into the end of the cylinder in which fluid had been trapped and this fluid acts on the piston to move it in the opposite direction. In order to rapidly initiate such reverse movement, it is necessary to introduce pressure fluid quickly to the chamber in which fluid had previously been trapped. The present invention provides a novel cushioning arrangement with a check valve action for trapping the cushioning fluid when fluid is being expelled from one end of the cylinder and to permit reverse flow of fluid into the cushioning area when fluid is being introduced to such cylinder end.

It is one of the objects of the present invention to provide a cushioning mechanism which includes a resilient packing ring which acts as a check valve to prevent outflow of trapped cushioning fluid but which permits inflow of fluid for assisting the piston to move quickly out of cushion.

It is another object to provide a cushioning device in which trapping of the cushioning fluid is accomplished by means of a spear carried by the piston which closes the opening of a hollow sleeve for trapping the cushioning fluid and in which the sleeve is radially shiftable for self alignment with the spear but is relatively stationary in an axial direction for avoiding detrimental inertia effects.

It is another object to provide a cushioning device of the type described in which a resilient rubber packing has a lip movable by fluid pressure into and out of engagement with a wall for closing and opening a flow passage leading to the chamber in which fluid is trapped, and in which the packing is so mounted that it is substantially free of sliding frictional engagement with such wall.

It is another object to provide a cushioning device of the type described in which a resilient rubber packing mounted within a groove in a rigid sleeve has an inner lip for flexing to and from sealing engagement with the groove bottom, and in which the end walls of the groove are perforated to permit passage of fluid past said lip when the same is out of engagement with the groove bottom.

Other objects of the invention will be apparent from the following description and from the drawings in which:

FIG. 4 is an enlarged fragmentary view showing the piston coming out of cushion, FIG. 5 is an enlarged fragmentary view of a modified form of the invention showing the parts with the piston moving into cushion, FIG. 6 is an enlarged fragmentary view of the modified form showing the parts with the piston moving out of cushion, and FIG. 7 is an end view of the sleeve for the modified form.

Figure 1:
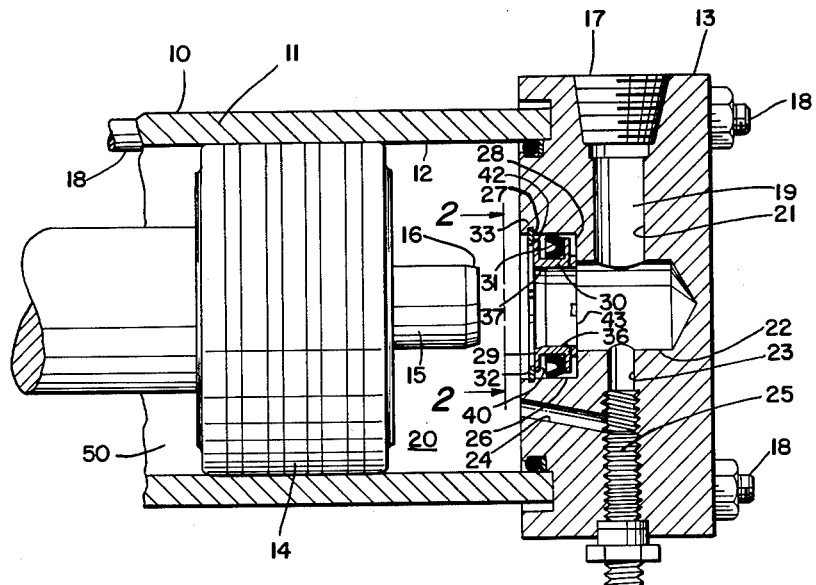
FIG. 1 is a cross section view of one end of a cylinder and showing the piston cushioning means.
Figure 2:
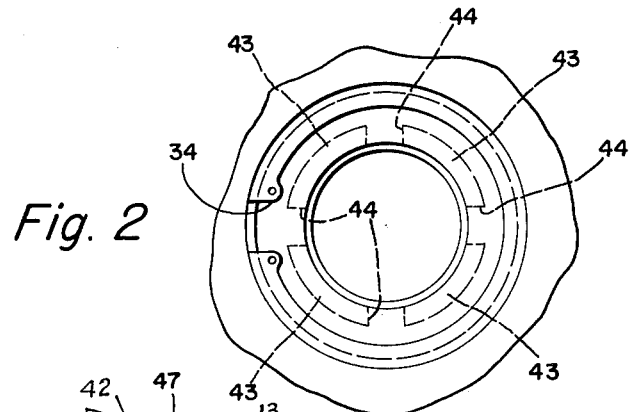
FIG. 2 is a fragmentary end view along the lines 2—2 of FIG. 1.
Figure 3:
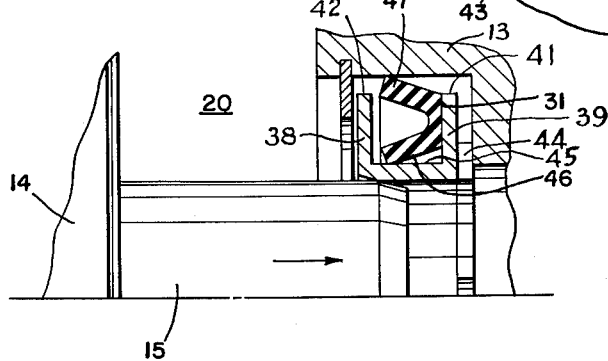
FIG. 3 is an enlarged fragmentary view showing the piston moving into cushion.

As shown in FIG. 1, the cylinder assembly, generally designated 10, includes a cylindrical tube 11 having a bore 12 which is closed at one end by a closure means or head 13. A piston 14 is mounted within the bore 12 for reciprocation and carries a projecting part or "spear" 15 which is movable therewith. The spear is cylindrical and preferably has a tapered portion 16.

The head 13 may be retained upon cylinder tube 11 by conventional means, such as tie rod bolts 18, and has a passage, generally designated 19, through which fluid may be introduced or expelled to and from expansible chamber 20 within tube 11 between piston 14 and closure member 13. The passage 19 includes a port 17, a transverse bore 21, and a longitudinal bore 24 leading to chamber 20. Fitted into bore 23 may be a throttling needle valve 25 for adjusting the opening between bores 23 and 24.

Bore 22 terminates at one end in a counterbore 26 having a cylindrical wall 27 and a transverse bottom wall 28.

Mounted in counterbore 26 is a check valve generally designated 29 which is comprised of an annular sleeve 30 of metal or other relatively rigid material, and a U-cup packing 31 of resilient rubber-like material. Check valve 29 is retained within counterbore 26 by a snap ring 32 mounted within a groove 33 in the cylindrical wall 27.

Sleeve 30 has a cylindrical bore 36 approximately axially aligned with bore 22 and of somewhat smaller diameter. The one end of bore 36 may be tapered as at 37 to further facilitate entry of spear 15.

The sleeve 30 has a groove 40 in its outer surface for receiving packing ring 31, the groove 40 forming front and rear radially extending flanges 38, 39. The outer surfaces 41 and 42 of the sleeve are of appreciably smaller diameter than the diameter of counterbore 26 so as to provide a radial clearance of approximately .005 to .010 inch therebetween. This clearance serves as a flow path for fluid as hereinafter explained. The inner end of the sleeve has an annular rib 43 formed thereon and the rib is slotted as at 44 to permit passage of fluid from bore 22 past counterbore bottom 28. Rib 43 is of larger diameter than bore 22 so that it will abut counterbore bottom 28.

Snap ring 32 retains sleeve 30 with a few thousandths of an inch axial travel of the sleeve between counterbore bottom 28 and the snap ring, only enough endwise clearance being provided so that sleeve 30 may readily shift in radial directions for centering itself upon spear 15. Likewise, packing 31 is retained within groove 40 with only a few thousandths of an inch end play.

Packing 31 is of conventional U shape with inner lip 46 normally biased by inherent resilience of the material into sealing engagement with the bottom wall 45 of packing groove 40 and with the outer lip 47 likewise normally biased into sealing engagement with counterbore wall 27.

By providing only the minimum amount of end play for sleeve 30 and packing 31 to accommodate radial movement of the parts, appreciable sliding movement of outer lip 47 with respect to counterbore wall 27 is avoided and thus the packing is not subjected to wear caused by sliding friction. Also, the sleeve 30 is not subject to appreciable inertia which would otherwise cause damage to the parts by the pounding of rib 43 against counterbore bottom wall 28 and of the opposite end of the sleeve against snap ring 32.

To operate the cylinder, air or other fluid under pressure may be admitted through port 17 and bore 21 to bore 22. At this time piston 14 will normally be at the rightward end of its stroke, as shown in FIG. 4 with spear 15 telescoped within sleeve 30 and preferably with the end of the spear projecting a short distance into bore 22. The fluid in bore 22 will press upon the end of spear 15 tending to move piston 14 to the left. Because of the relatively small area of the spear end surface this pressure may be insufficient to move the piston, or it may move the piston only very slowly. To overcome this, some of the fluid from bore 22 passes through passage 23 past needle valve 25 and through passage 24 to chamber 20 where it acts upon the much larger area presented by the end face of piston 14 and drives the piston to the left. However, because of the restriction offered by the needle valve and the relatively small passages 23, 24 fluid enters chamber 20 quite slowly by this route. In order to introduce fluid to chamber 20 more quickly while spear 15 is still telescoped with sleeve 30, a check valve action is provided by packing 31.

Thus, as shown in FIG. 4, fluid from bore 22 passes around the end of spear 15 through slots 44 and past outer surface 41 of the sleeve to the outer surface of packing lip 47. Pressure of the fluid causes lip 47 to collapse radially inward away from sealing contact with counterbore wall 27 to permit the fluid to pass over outer surface 42 of the ring and then through slot 34 in the snap ring to enter chamber 20. Not only does the fluid thus entering chamber 20 provide pressure against the adjacent face of piston 14 for moving the same to the left, but it also prevents formation of subatmospheric pressures within chamber 20 as the piston starts to move to the left. Such subatmospheric pressure would obviously make it still more difficult to move the piston leftward and require more time for the spear 15 to be withdrawn from sleeve 30. Upon withdrawal of the spear from the sleeve fluid under pressure from bore 22 will pass freely through sleeve bore 36 into chamber 20 to act upon piston 14 for continuing its movement in the leftward direction.

When reverse movement of the piston is desired, port 17 is connected to exhaust and fluid under pressure is admitted to chamber 50 on the other side of the piston 14 by conventional valving, not shown. This causes piston 14 to move to the right, and as it does so fluid from chamber 20 is expelled through bores 36, 22, 21, and port 20. At the same time, the inherent bias of resilient packing lip 47 will cause the latter to move outwardly into sealing engagement with counterbore wall 27 and thus prevent reversed flow of fluid past packing 31. Moreover, pressure of fluid from chamber 20 will act on the inner surface of lip 47 to apply additional sealing pressure thereto.

As piston 14 nears the end of its stroke in the rightward direction, spear 15 enters bore 36 of sleeve 30 to substantially cut off further expelling of fluid from chamber 20. As spear 15 enters bore 36 sleeve 30 may shift radially any slight amount necessary for proper alignment upon the spear, lip 47 having sufficient resilience and freedom of motion to permit such slight shifting and at the same time maintaining sealing contact about its entire periphery with counterbore wall 27.

As spear 15 enters bore 36 fluid will be trapped within chamber 20 for cushioning the stopping of piston 14. However, there will be a slight bleed of fluid from chamber 20 through passage 24, needle valve 25 and passage 23 to passage 19 and at the same time additional slight bleeding past the sliding fit of spear 15 in sleeve bore 36 into bore 22 and passage 19. This slight bleeding prevents too rapid stopping of piston 14 and the building up of excessive shock pressures within chamber 20. This is particularly desirable when liquid is used as the pressure fluid.

The modified form of FIGS. 5-7 is the same as the form shown in FIGS. 1-4 except that sleeve 30 is provided with a series of axially extending openings 53 and 54 through the front and rear flanges 38, 39, openings 54 being in register with slots 44. These openings facilitate flow of fluid from port 22 past packing inner lip 46 into chamber 20 when piston 14 is moving out of cushion, as illustrated in FIG. 6. To permit such flow the base portion 56 of the packing which joins the two lips 46, 47 has an inner diameter which is greater than the diameter of groove bottom 45 to permit the flow of fluid therebetween. Such flow path through openings 53, 54 and under lip 46 may be utilized to supplement flow past the outer surface of lip 47 or it may be relied upon to the exclusion of flow past lip 47. Also, openings 53 provide more ready access of fluid to chamber 20 past snap ring 32 regardless of whether openings 54 are provided.

Long life and continued efficient operation of the cushioning devices herein disclosed is due to a number of factors already mentioned. Thus, sliding friction of the spear as it moves into cushioning position is taken by a sleeve of metal or other rigid material, rather than by a soft resilient packing. Both the packing and sleeve are mounted for only a few thousandths of an inch endwise travel for substantially eliminating sliding friction upon the soft packing and also for substantially eliminating detrimental pounding and other inertial effects which would otherwise be present. At the same time, the sleeve and packing are free to move in radial directions for proper centering within counterbore 27 and upon the spear. Also, the packing is securely confined so that there is no chance for it to be blown out of position or of being pinched or damaged by moving parts.

Although two forms of the invention have been illustrated and described, it is obvious that other modifications may be made therein without departing from the scope of the invention as defined in the claims.

We claim:

1. A fluid operated cylinder assembly comprising a cylindrical member having a bore, closure means for said bore, said closure means having a passage through which fluid may be introduced to and expelled from said bore, a piston reciprocable within said bore, sleeve means of rigid material between said passage and bore, a flow path connecting said passage and bore, said sleeve means having a central opening connecting said passage with said bore, a part movable with said piston and receivable within said opening with a close sliding fit for closing the same when said piston is near said closure means, a resilient packing carried by one of said means, said packing having a flexible lip normally biased for closing said flow path and responsive to pressure of fluid from said passage for opening said flow path when fluid is being introduced through said passage.

2. A cylinder assembly in accordance with claim 1 in which said packing is carried within a groove on said sleeve means.

3. A cylinder assembly in accordance with claim 1 in which said packing is restrained against substantial axial movement with respect to both of said means whereby said packing is substantially free of sliding friction with each of said means when opening and closing said flow path.

4. A cylinder assembly in accordance with claim 1 in which said sleeve means is mounted within a cylindrical counterbore in said closure means and is radially spaced from the wall of said counterbore to provide said flow path, said radial spacing permitting lateral shifting of said sleeve for obtaining alignment of said opening with said part.

5. A cylinder assembly in accordance with claim 1 in which said sleeve means is mounted within a cylindrical counterbore in said closure means and is retained substantially in contact with the bottom of said counterbore so as to prevent substantial axial shifting of said sleeve means, said flow path including a passageway formed between said bottom and the opposed end of said sleeve means.

6. A cylinder assembly in accordance with claim 1 in which said sleeve means is mounted within a cylindrical counterbore in said closure means, said sleeve means having a radial passage formed in the end thereof which is adjacent the counterbore bottom, said radial passage forming a part of said flow path.

7. A fluid operated cylinder assembly comprising a cylindrical member having a bore, means for closing said bore, said closure means having a passage through which fluid may be introduced to and expelled from said bore, a piston reciprocable within said bore; a counterbore within said closure means between said passage and said bore, a sleeve of rigid material retained in said counterbore with its inner end substantially in contact with the bottom of said counterbore whereby said sleeve is restrained against appreciable axial movement, said sleeve having at least a portion thereof spaced from the wall of said counterbore so as to form a flow path therebetween, a groove in the outer face of said sleeve, a generally U shaped resilient packing ring in said groove and having an inner lip normally biased into engagement with the opposed surface of said groove bottom and an outer lip normally biased into engagement with the opposed surface of said counterbore wall, a part movable with said piston and receivable within said opening with a close sliding fit for closing the same when said piston is near said closure means, at least one of said lips being movable by pressure of fluid from said passage out of engagement with the respective one of said surfaces for opening said flow path, and a radial passage formed between said inner end of the sleeve and said counterbore bottom connecting said passage and said flow path.

8. A cylinder assembly in accordance with claim 7 in which said packing is likewise restrained against appreciable axial movement.

9. A cylinder assembly in accordance with claim 7 in which said sleeve is of smaller diameter than said counterbore so as to be radially shiftable therein and at least one of said lips is radially yieldable to permit said sleeve to center itself on said part when the latter enters said opening.

10. A fluid operated cylinder assembly in accordance with claim 1 in which said flow path includes at least one axially extending opening in said sleeve radially outward of said central opening.

11. A fluid operated cylinder assembly comprising a cylindrical member having a bore, means for closing said bore, said closure means having a passage through which fluid may be introduced to and expelled from said bore, a piston reciprocable within said bore, a sleeve of rigid material between said passage and bore, a flow path connecting said passage and bore, said sleeve having a central opening connecting said passage with said bore, a part movable with said piston and receivable within said opening with a close sliding fit for closing the same when said piston is near said closure means, a resilient packing carried by said sleeve, said sleeve having at least one radially extending flange engageable by said packing for limiting movement of said packing in one direction along said sleeve, said flow path including an axially extending opening through said flange, said packing having a flexible lip normally biased for closing said flow path and responsive to pressure of fluid from said passage for opening said flow path when fluid is introduced through said passage.

12. A fluid operated cylinder assembly in accordance with claim 11 in which said flow path includes a radially extending slot at one end of said sleeve adjacent said flange and said axially extending opening communicates with said slot.

13. A fluid operated cylinder assembly comprising a cylindrical member having a bore, means for closing said bore, said closure means having a passage through which fluid may be introduced to and expelled from said bore, a piston reciprocable within said bore, a sleeve of rigid material between said passage and bore, a flow path connecting said passage and bore, said sleeve having a central opening connecting said passage with said bore, a part movable with said piston and receivable within said opening with a close sliding fit and closing the same when said piston is near said closure means, said sleeve having a pair of spaced radially extending flanges defining a groove therebetween, a resilient packing within said groove and having a pair of flexible lips, said flow path having a first portion including axial openings through said flanges and having a branch portion including a clearance between said flanges and said closure means, one of said lips being normally biased for closing said first portion and the other of said lips being normally biased to close said second portion, said lips being responsive to pressure of fluid from said passage for opening the respective portions of said flow path when fluid is introduced through said passage.

14. A fluid operated cylinder assembly comprising a cylindrical member having a bore, means for closing said bore, said closure means having a passage through which fluid may be introduced to and expelled from said bore, a piston reciprocable within said bore, a sleeve of rigid material between said passage and bore, said sleeve having a central opening connecting said passage with said bore, a part movable within said piston and receivable within said opening with a close sliding fit for closing the same when said piston is near said closure means, a resilient packing carried by said sleeve, said sleeve having at least one radially extending flange engageable with said packing and limiting movement of said packing in one direction along said sleeve, said flow path including an axially extending opening through said flange, said packing having a pair of axially extending lips connected by a transversely extending base portion, one of said lips being normally biased into sealing engagement with a surface on said closure means and the other of said lips being normally biased into sealing engagement with a surface on said sleeve for closing said flow path, said lips being responsive to pressure of fluid from said passage for moving the same out of engagement with said surface for opening said flow path when fluid is introduced through said passage, said base portion being spaced radially outwardly from said sleeve surface, said space between said base and sleeve surface constituting a portion of said flow path and being in communication with said axial opening.

References Cited in the file of this patent

UNITED STATES PATENTS

| | | |
|---|---|---|
| Re. 24,532 | Halladay et al. | Sept. 9, 1958 |
| 2,493,602 | Sterrett | Jan. 3, 1950 |
| 2,704,996 | Peterson et al. | Mar. 29, 1955 |
| 2,710,595 | Peterson et al. | June 14, 1955 |
| 2,719,510 | Elder | Oct. 4, 1955 |
| 2,853,974 | Hewitt | Sept. 30, 1958 |
| 2,935,047 | Ortman et al. | May 3, 1960 |